US011120030B2

(12) United States Patent
Lin et al.

(10) Patent No.: US 11,120,030 B2
(45) Date of Patent: Sep. 14, 2021

(54) HIGH QUALIFIED PATTERN MINING METHOD AND APPARATUS, AND DATA PROCESSING DEVICE

(71) Applicant: TENCENT TECHNOLOGY (SHENZHEN) COMPANY LIMITED, Guangdong (CN)

(72) Inventors: Chun-wei Lin, Shenzhen (CN); Wensheng Gan, Shenzhen (CN); Lei Xiao, Shenzhen (CN); Wei Chen, Shenzhen (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 343 days.

(21) Appl. No.: 16/269,714

(22) Filed: Feb. 7, 2019

(65) Prior Publication Data

US 2019/0171640 A1 Jun. 6, 2019

Related U.S. Application Data

(63) Continuation of application No. PCT/CN2017/107738, filed on Oct. 26, 2017.

(30) Foreign Application Priority Data

Oct. 28, 2016 (CN) .......................... 201610969804.1

(51) Int. Cl.
*G06F 16/00* (2019.01)
*G06F 16/2458* (2019.01)
(Continued)

(52) U.S. Cl.
CPC ...... *G06F 16/2465* (2019.01); *G06F 16/2282* (2019.01); *G06F 17/11* (2013.01); *G06Q 40/04* (2013.01); *G06F 2216/03* (2013.01)

(58) Field of Classification Search
CPC .. G06F 16/2465; G06F 16/2282; G06F 17/11; G06F 2216/03
See application file for complete search history.

(56) References Cited

U.S. PATENT DOCUMENTS 6,173,280 B1 * 1/2001 Ramkumar ......... G06F 16/2465
6,912,505 B2 * 6/2005 Linden ............... G06Q 30/0633
705/14.53
(Continued)

FOREIGN PATENT DOCUMENTS

CN 101996102 A 3/2011
CN 103279570 A 9/2013
(Continued)

OTHER PUBLICATIONS

Written Opinion dated Jan. 25, 2018 from the International Searching Authority in International Application No. PCT/CN2017/107738.
(Continued)

*Primary Examiner* — Leslie Wong
(74) *Attorney, Agent, or Firm* — Sughrue Mion, PLLC

(57) ABSTRACT

A high qualified pattern mining method is provided. The high qualified pattern mining method is performed by one or more processors, and includes determining a support degree of an item set to be processed in a transaction database; determining a weight occupancy of the item to be processed in the transaction database; and determining that the item set to be processed is a high qualified pattern based on the support degree not being less than a product of a preset lowest support degree threshold value and a total number of transactions in the transaction database, and the weight occupancy not being less than a preset minimum weight occupancy threshold value.

20 Claims, 11 Drawing Sheets

(51) Int. Cl.
*G06Q 40/04* (2012.01)
*G06F 16/22* (2019.01)
*G06F 17/11* (2006.01)

(56) References Cited

U.S. PATENT DOCUMENTS

| | | | |
|---|---|---|---|
| 8,200,527 B1* | 6/2012 | Thompson | G06Q 10/06398 |
| | | | 705/7.39 |
| 10,198,735 B1* | 2/2019 | Humphries | G06Q 30/02 |
| 2004/0220901 A1* | 11/2004 | Lee | G06F 16/284 |
| 2008/0004989 A1* | 1/2008 | Yi | G06Q 30/0631 |
| | | | 705/26.1 |
| 2008/0168011 A1* | 7/2008 | Steinberg | G06F 16/322 |
| | | | 706/12 |
| 2015/0127602 A1* | 5/2015 | Luo | G06N 5/025 |
| | | | 707/607 |
| 2017/0053206 A1* | 2/2017 | Kala | G06N 5/02 |
| 2017/0228683 A1* | 8/2017 | Hu | G08G 1/00 |

FOREIGN PATENT DOCUMENTS

| | | |
|---|---|---|
| CN | 104239430 A | 12/2014 |
| CN | 105608182 A | 5/2016 |
| CN | 106033424 A | 10/2016 |

OTHER PUBLICATIONS

International Search Report for PCT/CN2017/107738, dated Jan. 25, 2018.

\* cited by examiner

Algorithm 1: Construction procedure

Input: $X, X_a, X_b$.
Output: $X_{ab}$ which having the weight-list and FW-table of $X_{ab}$, denoted as $X_{ab}.WL$ and $X_{ab}.FWT$.

1 set $X_{ab}.WL \leftarrow \emptyset, X_{ab}.FWT \leftarrow \emptyset$;
2 for *each tuple $E_a \in X_a.WL$* do
3     if $\exists E_a \in X_b.WL \wedge E_a.tid == E_b.tid$ then
4         if $X.WL \neq \emptyset$ then
5             Search for element $E \in X.WL, E.tid = E_a.tid$;
6             $E_{ab} \leftarrow\ <E_a.tid, E_a.wo+E_b.wo-E.wo, E_b.rwo>$;
7             $X_{ab}.FWT.wo\ +=\ E_a.wo + E_b.wo - E.wo$;
8             $X_{ab}.FWT.rwo\ +=\ E_b.rwo$;
9         else
10            $E_{ab} \leftarrow\ <E_a.tid, E_a.wo + E_b.wo, E_b.rwo>$;
11            $X_{ab}.FWT.wo\ +=\ E_a.wo + E_b.wo$;
12            $X_{ab}.FWT.rwo\ +=\ E_b.rwo$;
13     $X_{ab}.WL \leftarrow X_{ab}.WL \cup E_{ab}$;
14     $X_{ab}.FWT.sup\ ++$;
15 return $X_{ab}$

FIG. 3

Algorithm 2: QFWO algorithm

Input: $D$, $wtable$, $\alpha$, $\beta$.
Output: The complete set of high qualified patterns.

1. scan $D$ to calculate the $sup(i)$ of each item $i \in I$ and and $tw(T_q)$ of each transaction;
2. find $I^* \leftarrow \{i \in I | sup(i) \geq \alpha \times |D|\}$, w.r.t. $FP^1$;
3. sort $I^*$ in the designed total order $\prec$;
4. scan $D$ once to build the weight-list and weight-table for each 1-item $i \in I^*$;
5. call $HQP\text{-}Search(\phi, I^*, \alpha, \beta)$;
6. return $HQPs$

---

Algorithm 3: HQP-Search procedure

Input: $X$, $extenOfX$, $\alpha$, $\beta$.
Output: The complete set of $HQPs$.

1. for each itemset $X_a \in extenOfX$ do
2.     obtain $sup(X_a)$ and $wo(X_a)$ from the built $X_a.FWT$;
3.     if $sup(X_a) \geq \alpha \times |D|$ then
4.         if $wo(X_a) \geq \beta$ then
5.             $HQPs \leftarrow HQPs \cup X_a$;
6.         $\hat{\phi}(X_a) \leftarrow UpperBound(X_a.WL, \alpha)$;
7.         if $\hat{\phi}(X_a) \geq \beta$ then
8.             $extenOfX_a \leftarrow \emptyset$;
9.             for each $X_b \in extenOfX$ such that $X_a \prec X_b$ do
10.                 $X_{ab} \leftarrow X_a \cup X_b$;
11.                 call $Construct(X, X_a, X_b)$;
12.                 if $X_{ab}.WL \neq \emptyset \land sup(X_{ab}) \geq \alpha \times |D|$ then
13.                     $extenOfX_a \leftarrow extenOfX_a \cup X_{ab}.WL$;
14.         call $HQP\text{-}Search(X_a, extenOfX_a, \alpha, \beta)$;
15. return $HQPs$

FIG. 4

LEMMA 1. *Given a subtree rooted at $X$, its supporting transaction set $\Gamma_X$ and the set of its 1-extension $X$ which is denoted as $E$, then for any possible qualified itemset $W$ in the subtree, we have:*

$$wo(W) \leq \frac{\sum_{W \subseteq T_q \wedge T_q \in D} wo(X, T_q) + rwo(X, T_q)}{|\Gamma_W|}. \quad (4)$$

PROOF. Since $W$ is a $k$-extension of $X$, $\Gamma_W \subseteq \Gamma_X$, we have $(W - X) = (W/X)$. Thus, in each $T_q$, $wo(W/X, T_q) \leq wo(T_q/X, T_q)$. The following relationships can be obtained: for each transaction $T_q$ in $D$, since $$wo(W) = \frac{\sum_{W \subseteq T_q \wedge T_q \in D} wo(X, T_q)}{|\Gamma_W|}$$

$$= \frac{\sum_{W \subseteq T_q \wedge T_q \in D} wo(X, T_q) + wo(W - X, T_q)}{|\Gamma_W|}$$

$$\leq \frac{\sum_{W \subseteq T_q \wedge T_q \in D} wo(X, T_q) + wo(T_q/X, T_q)}{|\Gamma_W|}$$

$$\implies wo(W) \leq \frac{\sum_{W \subseteq T_q \wedge T_q \in D} wo(X, T_q) + wo(T_q/X, T_q)}{|\Gamma_W|}.$$

$$\implies wo(W) \leq \frac{\sum_{W \subseteq T_q \wedge T_q \in D} wo(X, T_q) + rwo(X, T_q)}{|\Gamma_W|}.$$

FIG. 5

LEMMA 2. *Given the minimum support threshold $\alpha$, a subtree rooted at $X$, its supporting transaction set $\Gamma_X$ and the set of its 1-extension $X$ is denoted as $E$. For any possible qualified pattern $W$ in the subtree, an upper bound of weight occupancy of $W$ in the subtree is existed:*

$$\hat{\phi}(W) = \frac{\sum_{top\alpha\times|D|, T_q \in \Gamma_X} wo(X, T_q) + rwo(X, T_q)}{\alpha \times |D|} \geq wo(W). \quad (5)$$

PROOF. Note that $\Gamma_W \subseteq \Gamma_X$ and $\Gamma_W$ is unknown, we calculate $(wo(X, T_q) + rwo(X, T_q))$ for all transactions in $\Gamma_X$ and put into a vector set (denoted as $V_{occu}$), then sort $V_{occu}$ in descending order (denoted as $V_{occu}^{\downarrow}$). Since the average of top $k$ $(0 < k \leq |\Gamma_W|)$ values of vector $V_{occu}^{\downarrow}$ is an upper bound of the average of total $|\Gamma_W|$ values of $\frac{\sum_{W \subseteq T_q \wedge T_q \in D} wo(X, T_q) + rwo(X, T_q)}{|\Gamma_W|}$. Since a qualified pattern should be supported by at least $\alpha \times |D|$ transactions, we have $\alpha \times |D| \leq k \leq |\Gamma_W| \leq |\Gamma_X|$. We have, $$\phi(W) \leq \frac{\sum_{W \subseteq T_q \wedge T_q \in D} wo(X, T_q) + rwo(X, T_q)}{|\Gamma_W|}$$

$$\implies \phi(W) \leq \frac{\sum_{topk, T_q \in \Gamma_X} \{wo(X, T_q) + rwo(X, T_q)\}^{\downarrow}}{|\Gamma_W|}$$

$$\implies \phi(W) \leq \frac{\sum_{top\alpha\times|D|, T_q \in \Gamma_X} \{wo(X, T_q) + rwo(X, T_q)\}^{\downarrow}}{\alpha \times |D|}$$

$$\implies \phi(W) \leq \hat{\phi}(W).$$

FIG. 6

Algorithm 4: UpperBound procedure

Input: $X_q.WL$, $\alpha$.
Output: The upper bound $\hat{\phi}(X_a)$.

1. $sumTopK \leftarrow 0$, $\hat{\phi}(X_a) \leftarrow 0$, $V_{occu} \leftarrow \emptyset$;
2. calculate $(wo(X, T_q) + rwo(X, T_q))$ of each tuple from the built $X_a.WL$ and put them into the set of $V_{occu}$;
3. sort $V_{occu}$ by descending order as $V_{occu}^{\downarrow}$;
4. for $k \leftarrow 1$ to $\alpha \times |D|$ in $V_{occu}^{\downarrow}$ do
5. $\quad \lfloor\ sumTopK \leftarrow sumTopK + V_{occu}^{\downarrow}[k]$;
6. $\hat{\phi}(X_a) = \dfrac{sumTopK}{\alpha \times |D|}$;
7. return $\hat{\phi}(X_a)$

FIG. 8

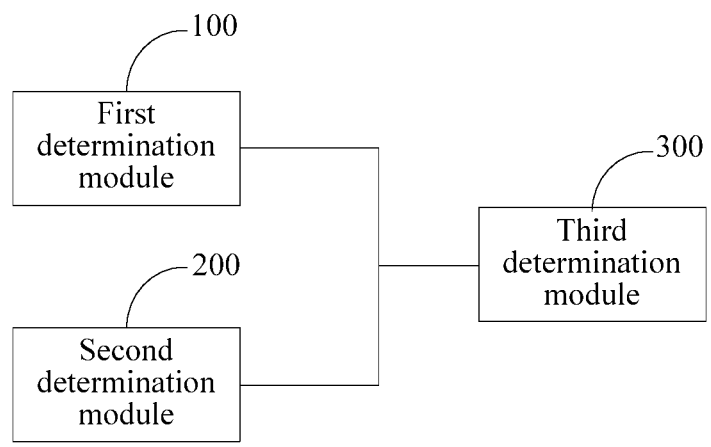

FIG. 9

HIGH QUALIFIED PATTERN MINING METHOD AND APPARATUS, AND DATA PROCESSING DEVICE

CROSS-REFERENCE TO RELATED APPLICATIONS

This application is a continuation of International Patent Application No. PCT/CN2017/107738, filed on Oct. 26, 2017, which claims priority from Chinese Patent Application No. 201610969804.1, filed in the Chinese Patent Office on Oct. 28, 2016, the disclosures of which are incorporated by reference in their entireties.

BACKGROUND

Field

Methods and apparatuses consistent with embodiments relate to data processing, particularly to a high qualified pattern mining method and apparatus, and a data processing device.

Related Art

A transaction database is a database capable of recording transactions such as trades and news. The transaction database generally includes at least one transaction record, and each transaction includes at least one item. To represent an association rule among the items in the transaction database, at least one item would be collected to form an item set. As a transaction database of a trade type and the like may reflect a preference of a user, it often mines an item set to be recommended to the user from multiple item sets formed by the transaction database during recommendation of information to the user. In an item set mining process, an item set (a high qualified pattern for short) with a relatively high utility value is often considered being used.

The high qualified pattern is the item set with the relatively high utility value. During mining of the high qualified pattern at the present, support degrees of various item sets in the transaction database are calculated, and then the support degrees of the various item sets in the transaction database are compared with a product of a set lowest support degree threshold value with a total number of trades of the transaction database, so that an item set, the support degree of which in the transaction database is greater than or equal to the product obtained by multiplying the set lowest support degree threshold value with the total number of trades of the transaction database, is used as the high qualified pattern.

Therefore, how to mine item-related high qualified patterns and improve the accuracy of a mining result becomes a problem that should be considered by a person skilled in the art.

SUMMARY

According to an aspect of an embodiment, there is provided a high qualified pattern mining method performed by one or more processors, the high qualified pattern mining method including: determining a support degree of an item set to be processed in a transaction database; determining a weight occupancy of the item to be processed in the transaction database; and determining that the item set to be processed is a high qualified pattern based on the support degree not being less than a product of a preset lowest support degree threshold value and a total number of transactions in the transaction database, and the weight occupancy not being less than a preset minimum weight occupancy threshold value.

According to an aspect of another embodiment, there is provided a high qualified pattern item set mining apparatus including: at least one memory configured to store computer program code; and at least one processor configured to access the at least one memory and operate according to the computer program code. The computer program code includes: first determination code configured to cause the at least one processor to determine a support degree of an item set to be processed in a transaction database; second determination code configured to cause the at least one processor to determine a weight occupancy of the item set to be processed in the transaction database; and third determination code configured to cause the at least one processor to determine that the item set to be processed is a high qualified pattern based on the support degree not being less than a product of a preset lowest support degree threshold value and a total number of transactions in the transaction database, and the weight occupancy not being less than a preset minimum weight occupancy threshold value.

According to an aspect of yet another embodiment, there is provided a non-transitory computer-readable storage medium storing instructions that cause at least one processor to determine a support degree of an item set to be processed in a transaction database; determine a weight occupancy of the item set to be processed in the transaction database; and determine that the item set to be processed is a high qualified pattern based on the support degree not being less than a product of a preset lowest support degree threshold value and a total number of transactions in the transaction database, and the weight occupancy not being less than a preset minimum weight occupancy threshold value.

BRIEF DESCRIPTION OF THE DRAWINGS

FIG. 3 is a code of a weight occupancy calculation method provided by an embodiment;

FIG. 4 is a code of another weight occupancy calculation method provided by an embodiment;

FIG. 5 is a principle code of an upper bound of weight occupancy provided by an embodiment;

FIG. 6 is a principle code of an upper bound of weight occupancy provided by an embodiment;

FIG. 8 is a principle code of an upper bound of weight occupancy provided by an embodiment;

FIG. 9 is a block diagram of a structure of a high qualified pattern mining apparatus provided by an embodiment;

DETAILED DESCRIPTION

Figure 1:
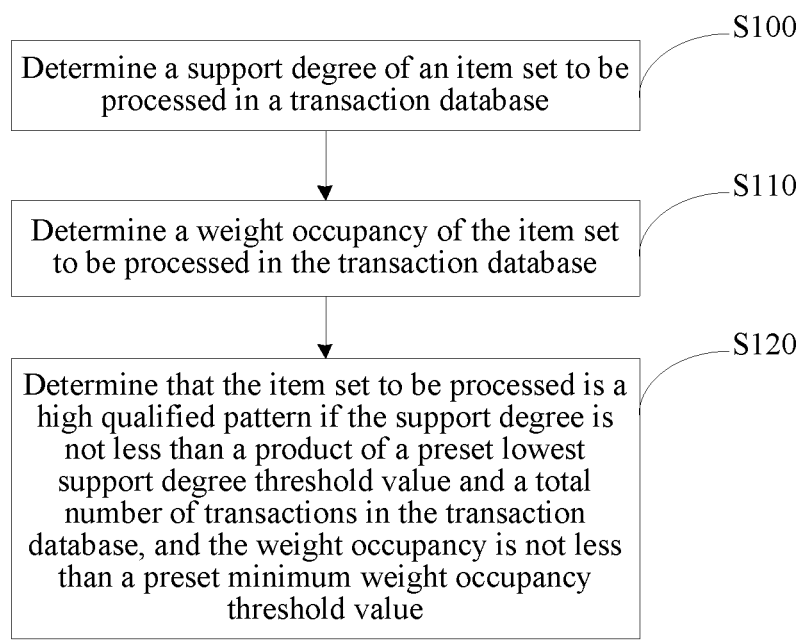
FIG. 1 is a flowchart of a high qualified pattern mining method provided by an embodiment.

During mining of a high qualified pattern, support degrees of various item sets in a transaction database may be considered, which possibly cause irrelevancy of various items in the mined high qualified pattern, so that the accuracy of a mining result may be affected. An item-unrelated high qualified pattern is unfavorable for guiding a user in transactions, such as a trade, after being recommended to the user, and even a phenomenon of misguiding may possibly occur, which affects the accuracy of recommendation.

For example, for a webpage content printing recommendation, an existing high qualified pattern mining method may recommend an item set with the highest support degree to the user. However, as the support degree of the item set increases, the number of items in the item set is correspondingly reduced, thereby resulting in incompleteness of a result obtained by a system and information recommended to the user. The user further needs to find missing information, resulting in a relatively poor user experience.

In this regard, an embodiment provides a high qualified pattern mining method and apparatus, and may solve the above-mentioned technical problems.

For the purpose of facilitating understanding of the technical solution described by the embodiments, the following firstly introduces concepts of names related in the embodiment.

A transaction indicates a record in the transaction database. For example, when the transaction database records purchase records of supermarket commodities, each transaction in the transaction database corresponds to one purchase record of the commodities, and the purchase record includes information such as the number and names of purchased commodities.

An item indicates each information project recorded in a transaction, and each transaction includes at least one item. For example, when the transactions in the database correspond to the purchase records of a customer, the items in the transactions may be information such as the names and the number of the purchased commodities in the purchase records.

For example, the transaction database as shown in Table I include ten transactions T1 to T10 which are respectively "a, c, e", "b, d", "a, b, c", "c, e", "a, c, d, e", "b, c, e", "b, d", "a, b, c, d, e", "d, e" and "b, c, e", and a, b, c, d and e may respectively represent types of the purchased commodities, types of stocks, types of news and the like.

TABLE I

| Transaction database | |
|---|---|
| TID | Transaction |
| $T_1$ | a, c, e |
| $T_2$ | b, d |
| $T_3$ | a, b, c |
| $T_4$ | c, e |
| $T_5$ | a, c, d, e |

TABLE I-continued

| Transaction database | |
|---|---|
| TID | Transaction |
| $T_6$ | b, c, e |
| $T_7$ | b, d |
| $T_8$ | a, b, c, d, e |
| $T_9$ | d, e |
| $T_{10}$ | b, c, e |

An item set indicates a set composed of at least one item, and is used for representing an internal association rule of the transaction database. A difference between a transaction and an item set is that the transaction is generally a record generated by triggering of an actual event in the transaction database, and the item set is generally mined from the transaction database, and does not necessarily have an actual meaning.

A K-item set is a set including k items. For example, a 1-item set may be A, including only an item A. 2-item sets may be A and B, including items A and B.

A transaction identifier is used for distinguishing different transactions in the same transaction database. For example, the transaction identifier for the transactions in the first line of the database is T1, and the transaction identifier for the transactions in the second line is T2.

An item weight in D indicates a weight of a single item in the transaction database, and is used for expressing an importance degree, namely w(ij), of the item in transaction database.

For example, the transaction database as shown in Table I includes 5 items a, b, c, d and e. It supposes that a weight-table (w-table) of the 5 items customized by the user is as shown in Table II.

TABLE II

| Weight-table | | | | | |
|---|---|---|---|---|---|
| | Item | | | | |
| | a | b | c | d | e |
| Weight | 0.2 | 0.75 | 1.0 | 0.5 | 0.4 |

An itemset weight in D indicates a weight of an item set in the transaction database, and is used for expressing an importance degree $w(X)=\Sigma_{i_j \in X} w(i_j)$ of the item set in the transaction database, wherein ij represents the jth item in the item X. At the same time, the weight of the item set in a transaction where the item set appears is equal to a weight value of the item set in the transaction database, namely $w(X, T_q)=w(X)=\Sigma_{i_j \in X} w(i_j)$.

A transaction weight indicates the weight value of a certain transaction, is equal to the weight sum of all items constituting the transaction, and is used for expressing an importance degree, namely $tw(T_q)=\Sigma_{i_j \in T_q} w(i_j)$, of the transaction, wherein ij is the jth item in the transaction $T_q$.

A weight occupancy in transaction of an item set is equal to a ratio of the weight value of the item set to the weight value of the transaction, and is used for expressing a weight occupancy of the item set in the transaction, namely $$wo(X, T_q) = \frac{w(X, T_q)}{tw(T_q)}.$$

A weight occupancy in database of an item set is equal to an average value of an adding sum of the weight occupancies of the item set in transactions where the item set appears, and is used for expressing a weight occupancy of the item set in the transaction database, namely $$wo(X) = \frac{\sum_{X \subseteq T_q \wedge T_q \in D} wo(X, T_q)}{|\Gamma_X|}.$$

ΓX is a set of the transactions where the item set X appears, so that |ΓX| is equal to a support degree value sup(X) of the item set X in the transaction database.

A high qualified pattern (HQP): in a certain database, if a certain item set accords with the following two conditions: (1) the support degree value of the item set is greater than or equal to a product obtained by multiplying a lowest support degree threshold value with a total number of trades of the database, and (2) the weight occupancy of the item set is greater than or equal to a minimum weight occupancy threshold value, the item set is determined as a frequent HQP with a high weight occupancy.

In the database of the exemplification, according to Table I and Table II, when the lowest support degree threshold value α (α is more than 0 and less than or equal to 1) and the minimum weight occupancy threshold value β (β is more than 0 and less than or equal to 1) are respectively set as α=20% and β=0.6, all HQPs are as shown in Table III.

TABLE III

| | High qualified pattern | |
|---|---|---|
| Item set | Sup (Support degree) | Wo (Weight occupancy) |
| (ac) | 4 | 0.6129 |
| (bc) | 4 | 0.8103 |
| (bd) | 3 | 0.8182 |
| (cd) | 2 | 0.6477 |
| (ce) | 6 | 0.7096 |
| (abc) | 2 | 0.8545 |
| (acd) | 2 | 0.7341 |
| (ace) | 3 | 0.7652 |
| (bce) | 3 | 0.9152 |
| (cde) | 2 | 0.7773 |
| (acde) | 2 | 0.8636 |

Remaining weight occupancy in transaction (rwo) of an item set in a certain transaction is equal to a ratio of the adding sum of the weight occupancies of various items (except the item set) sequenced on the right in the transaction to the transaction weight value, and is used for expressing the remaining weight occupancy, namely $$rwo(X, T_q) = \frac{\sum_{i_j \in X \wedge X \in T_q \wedge X < i_j} w(i_j, T_q)}{tw(T_q)},$$

of the item set in the transaction.

For example, in Table I, in consideration of an item set (ab), we have wo(ab, T3)=(w(a,T3)+w(b,T3))/tw(T3)=(0.2+0.75)/(0.2+0.75+1.0)=0.95/1.95≈0.4872, and wo(ab, T8)=(0.2+0.75)/(0.2+0.75+1.0+0.5+0.4)=0.95/2.85≈0.3333.

rwo(a, T8)=(w(b, T8)+w(c, T8)+w(d, T8)+w(e, T8))/tw(T8)=(0.75+1.0+0.5+0.4)/2.8500≈0.9298, and rwo(ac, T8)=(w(d, T8)+w(e, T8))/tw(T8)=(0.5+0.4)/2.8500≈0.3158.

A weight-list of each item set includes a series of tuple information <tid, wo, rwo> of the item set in transactions, where the item set appears, in the database, wherein tid is a transaction tid where the item set appears; wo is the weight occupancy value of the item set in the transaction; and rwo is the remaining weight occupancy value of the item set in the transaction, namely (rwo (X, Tq)).

A server may determine a trade to which a first object belongs after determining a sequencing order of various objects, so as to calculate a weight occupancy value of the first object in each trade to which the first object belongs and a weight occupancy value sum (which is referred to the remaining weight occupancy value rwo) of various items sequenced on the right (except the weight value of the first object) in each trade. Then, the server may determine a trade to which a second object belongs, so as to calculate a weight occupancy value of the second object in each trade to which the second object belongs and a remaining weight occupancy value, and so on. Results obtained by calculation of the server may be expressed by means of tables (weight-table), as shown in Table IV:

TABLE IV

| | Weight-list | | | | | | | | | | | | | |
|---|---|---|---|---|---|---|---|---|---|---|---|---|---|---|
| | (a) | | | (d) | | | (b) | | | (c) | | | (e) | |
| tid | wo | rwo | tid | wo | rwo | tid | wo | rwo | tid | wo | rwo | tid | wo | rwo |
| 1 | 0.1333 | 0.8667 | 2 | 0.4000 | 0.6000 | 2 | 0.6000 | 0 | 1 | 0.6667 | 0.2000 | 1 | 0.2000 | 0 |
| 3 | 0.1026 | 0.8974 | 5 | 0.2500 | 0.6500 | 3 | 0.3846 | 0.5128 | 3 | 0.5128 | 0 | 4 | 0.2308 | 0 |
| 5 | 0.1000 | 0.9000 | 7 | 0.4000 | 0.6000 | 6 | 0.3659 | 0.6341 | 4 | 0.7692 | 0.2308 | 5 | 0.1500 | 0 |
| 8 | 0.0727 | 0.9273 | 8 | 0.1818 | 0.7454 | 7 | 0.6000 | 0 | 5 | 0.5000 | 0.1500 | 6 | 0.1463 | 0 |
| | | | 9 | 0.6250 | 0.3750 | 8 | 0.2727 | 0.4727 | 6 | 0.4878 | 0.1463 | 8 | 0.1091 | 0 |
| | | | | | | 10 | 0.3659 | 0.6341 | 8 | 0.3636 | 0.1091 | 9 | 0.3750 | 0 |
| | | | | | | | | | 10 | 0.4878 | 0.1463 | 10 | 0.1463 | 0 |

14. Frequency-weight table: the frequency-weight table of each item set includes frequency and weight occupancy information Name.<sup(X), wo(X), rwo(X)> of the item set in the database, wherein Name is the name of the item set; sup(X) is a support degree value of the item in the database; wo(X) is a weight occupancy of the item in the database; and rwo(X) is a remaining weight occupancy of the item set in the database $$\left( \text{namely } rwo(X) = \frac{\sum_{X \subseteq T_q \wedge T_q \in D} rwo(X, T_q)}{|\Gamma_X|} \right).$$

For example, the frequency-weight table of the item (a) in the database of the exemplification is as shown in Table V.

TABLE V

Frequency-weight table

| weight-list (a) | | | weight-table (a) | | |
|---|---|---|---|---|---|
| tid | wo | rwo | sup | wo | rwo |
| 1 | 0.1333 | 0.8667 | 4 | 0.1022 | 0.8978 |
| 3 | 0.1026 | 0.8974 | | | |
| 5 | 0.1000 | 0.9000 | | | |
| 8 | 0.0727 | 0.9273 | | | | wo(a) = (0.1333 + 0.1026 + 0.1 + 0.0727)/4 = 0.1022;
rwo(a) = (0.8667 + 0.8974 + 0.9 + 0.9273)/4 = 0.8978

| (a) | (b) |
|---|---|

The following clearly and completely describes the technical solutions in the embodiments with reference to the accompanying drawings in the embodiments. Apparently, the described embodiments are some of the embodiments rather than all of the embodiments. All other embodiments obtained by a person of ordinary skill in the art based on the embodiments without creative efforts shall fall within the protection scope.

FIG. 1 is a flowchart of a high qualified pattern mining method provided by the embodiment. The method may be applied to a data processing device having data processing capacity, such as a network-side data processing server. In some possible implementation manners, mining of high qualified patterns may be also performed a user-side computer and other devices according to different data mining scenes. Referring to FIG. 1, the high qualified pattern mining method provided by the embodiment may include:

Step S100, determine a support degree of an item set to be processed in a transaction database.

The item set to be processed may be any item set mined from the transaction database. One item set includes at least one item. For various item sets to be processed, this embodiment may determine the support degrees of the item sets to be processed in the transaction database. In one implementation manner, the number of target transactions corresponding to the item set to be processed is determined as the support degree of the item set to be processed in the transaction database, wherein the target transactions corresponding to the item set to be processed are transactions including all items of the item set to be processed.

With reference to Table III and Table I, supposing that the item set to be processed is ac, transactions including items ac in Table I are the target transactions. It can be known according to Table I that: the target transactions are T1: ace, T3: abc, T5: acde and T8: abcde, and there are 4 target transactions, so that the support degree of the item set to be processed ac in the transaction database is 4. Similarly, if the item set to be processed is a, transactions including the item a in Table I are the target transactions, and the target transactions are T1: ace, T3: abc, T5: acde and T8: abcde, so that the support degree of the item set to be processed a is also 4, as shown in Table V.

Step S110, determine a weight occupancy of the item set to be processed in the transaction database.

In some possible implementation manners, determining the weight occupancy of the item set to be processed in the transaction database may include: establish a weight-table of various items in the transaction database, the weight-table including weight values corresponding to the various items; and calculate the weight occupancy of the item set to be processed in the transaction database according to the weight-table and a transaction list of the transaction database.

For example, in Table I, in consideration of an item set (ab), we have wo(ab, T3)=(w(a,T3)+w(b,T3))/tw(T3)=(0.2+0.75)/(0.2+0.75+1.0)=0.95/1.95≈0.4872, and wo(ab, T8)= (0.2+0.75)/(0.2+0.75+1.0+0.5+0.3)=0.95/2.75≈0.3455.

In some possible implementation manners, calculating the weight occupancy of the item set to be processed in the transaction database according to the weight-table and the transaction list of the transaction database may include: determining a weight value sum of the items included in the item set to be processed according to the weight-table; respectively determining quotients of the weight value sum and weight value sums of the various items in the target transactions corresponding to the item set to be processed, the quotients being weight occupancies of the item set to be processed in the target transactions; adding up the various determined quotients, thus obtaining a quotient sum; and taking a quotient obtained by dividing the obtained quotient sum by the number of the target transactions corresponding to the item set to be processed as the weight occupancy of the item set to be processed in the transaction database.

For example, in Table V, in consideration of an item set (a), we have wo(a)=(0.1333+0.1026+0.1+0.0727)/4=0.1022.

Specifically, with reference to Table I, the support degrees of the various items can be obtained: the support degree sup(a) of the item a is 4 as a appears in the four transactions T1, T3, T5 and T8. The support degree sup(b) of the item b is 6 as b appears in totally six transactions T2, T3, T6, T7, T8 and T10. Similarly, according to Table I, the support degree sup(c) of the item c is 7, the support degree sup(d) of the item d is 5, and the support degree sup(e) of the item e is 7. Because of sup(a)<sup(d)<sup(b)<sup(c)<sup(e), the support degrees are sequenced to be a<d<b<c<e from small to large. It should be noted that c and e have the same support degree of 7, so that c and e may be sequenced according to a sequencing order of the 26 letters, namely in the 26-letter table, c is located in front of e, so that c is ranked in priority during sequencing of the support degrees in this embodiment.

Figure 2:
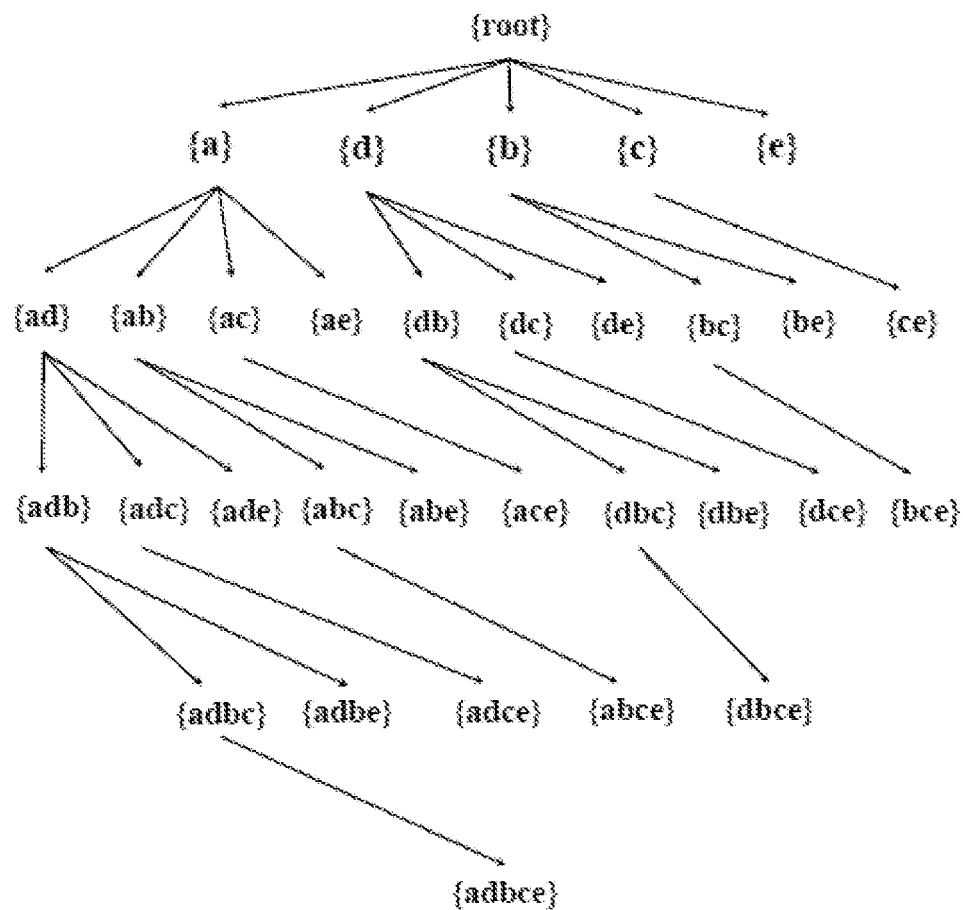
FIG. 2 is a sequencing diagram of support degrees of a high qualified pattern mining method provided by an embodiment.

Then, various items in the k-item set are sequenced on the basis of the sequencing order of the support degrees of the various items. As shown in FIG. 2, when k is equal to 2, combination modes of the item set are ad, ab, ac, ae, db, dc, de, bc, be and ce. When k is equal to 3, combination modes of the item set are adb, adc, ade, abc, abe, ace, dbc, dce and bce. When k is equal to 4, combination modes of the item set include adbc, adbe, adce, abce and dbce. When k is equal to 5, a communication mode of the item set is adbce.

In this embodiment, pseudo-codes of construction functions of the weight-list and the frequency-weight table are as shown in FIG. 3. The main idea is that the weight-list of a K-item set is generated by combining weight-lists of (k−1)-item sets two by two, namely the weight-list of a 3-item set is generated by combining the weight-lists of 2-item sets, and the weight-list of a 4-item set is generated by combining the weight-lists of the 3-item sets. It should be particularly noted that in this embodiment, a weight occupancy calculation method when k is more than or equal to 3 and a weight occupancy calculation method when k is less than or equal to 2 are different. When k is more than or equal to 3, the specific calculation method may be a method as shown by Line 6 in FIG. 3. When k is equal to 1 or 2, the calculation method may be as shown by Line 10 in FIG. 3. The specific calculation method is discussed below.

When k is equal to 1, Table IV is firstly obtained according to Table I and Table II, namely the weight occupancy values and the remaining weight occupancy values of the various items are obtained according to the appearance of the items in the transaction database. For example, if a appears in T1, T3, T5 and T8 in Table I, wo(a, T1), wo(a, T3), wo(a, T5), wo(a, T8) and rwo(a, T1), rwo(a, T3), rwo(a, T5), rwo(a, T8) are calculated in sequence. Similarly, if d appears in T2, T5, T7, T8 and T9, wo(d, T2), wo(d, T5), wo(d, T7), wo(d, T8), wo (d, T9) and rwo(d, T2), rwo(d, T5), rwo(d, T7), rwo(d, T8), rwo (d, T9) are calculated. By reasoning of parity, the weight-lists of b, c and e are calculated.

The calculated weight occupancies and remaining weight occupancies are sequenced according to the support degrees to obtain Table IV.

The frequency-weight table, as shown in Table V, of the item can be obtained according to the weight-lists in Table IV. Table V only shows such a case that the item is a. Frequency-weight tables, as shown in Table VI, of the various items in the transaction database are obtained according to the same calculation method.

TABLE VI

| Frequency -weight table | | | | | | | | |
|---|---|---|---|---|---|---|---|---|
| (a) | | | (d) | | | (b) | | |
| sup | wo | rwo | sup | wo | rwo | sup | wo | rwo |
| 4 | 0.1022 | 0.8978 | 5 | 0.3714 | 0.5941 | 6 | 0.4315 | 0.3756 |
| (c) | | | (e) | | | | | |
| sup | wo | rwo | sup | wo | rwo | | | |
| 7 | 0.5411 | 0.1404 | 7 | 0.1939 | 0 | | | |

When k is equal to 2, frequency-weight tables of item sets ad, ab, ac, ae, db, dc, de, bc, be and ce are calculated in sequence. Now ad and ac are taken as examples. The number of times that ad appears in the transaction database (Table I) is counted, namely the number of target transactions including the items ad in the transaction database is counted, the target transactions being T5 and T8, so that the support degree sup(ad) of ad is equal to 2. Similarly, as ac appears in T1, T3, T5 and T8, the sup(ac) is equal to 4.

In this embodiment, wo(ad, T5) and wo(ad, T8) are required to be calculated in sequence: wo(ad, T5)=(wo(a, T5)+wo(d, T5))/tw(T5)=(0.2+0.5)/(0.2+1.0+0.5+0.4)= 0.3333, and wo(ad, T8)=(wo(a, T8)+wo(d, T8)) kw(T8)= (0.2+0.5)/(0.2+0.75+1.0+0.5+0.4)=0.2456, thereby obtaining wo(ad)=(wo(ad, T5)+wo(ad, T8))/2=(0.3333+0.2556)/ 2=0.2895 Similarly, the frequency-weight tables of ab, ac, ae, db, dc, de, bc, be and ce are calculated.

When k is equal to 3, frequency-weight tables of adb, adc, ade, abc, abe, ace, dbc, dbe, dce and bce are calculated in sequence. It should be noted that when k is more than or equal to 3, repeatedly appearing parts are required to be abandoned during calculation of the weight occupancy. For calculation of the weight occupancy of adc, we have wo(adc)=wo(ad)+wo(ac)−wo(a), and similarly, we have wo(ade)=wo(ad)+wo(ae)−wo(a), and wo(adce)=wo(adc)+ wo(ade)−wo(ad).

It can be seen that in this embodiment, during calculation of the weight occupancy, the weight-list of the k-item set may be generated quickly by combining the weight-lists of the (k−1)-item sets two by two, and pruning is performed by applying three pruning strategies to filter out those futureless item sets as early as possible. An algorithm code for implementation of the pruning may be an algorithm code as shown in FIG. 4.

The principle of the algorithm code is that effective sequencing is performed on the k-item set according to the support degrees of the various items in the item set, as shown in FIG. 2. For example, for the 3-item sets, only the frequency-weight tables of these items sets abd, adc, ade, abc, abe, ace, dbc, dbe, dce and bce, instead of any 3-item set composed of a, b, c, d and e, are required to be calculated, thereby reducing a large number of invalid calculations.

Step S120, determine that the item set to be processed is a high qualified pattern if the support degree is not less than a product of a preset lowest support degree threshold value and a total number of transactions in the transaction database, and the weight occupancy is not less than a preset minimum weight occupancy threshold value.

In some possible implementation manners, a process of determining the preset lowest support degree threshold value may include: determining lowest support degree threshold values of various items in the item set to be processed according to a lowest support degree threshold value table, the lowest support degree threshold values corresponding to the various items being recorded in the lowest support degree threshold value table; determining the minimum lowest support degree threshold value in the lowest support degree threshold values of the various items in the item set to be processed as the preset lowest support degree threshold value corresponding to the item set to be processed.

In some possible implementation manners, the method further may include: determining that all supersets of the item set to be processed do not belong to the item-related high qualified pattern if item sets including at least one item are sequenced according to the weight occupancies from small to large, and the weight occupancy of the item set to be processed is less than the preset minimum weight occupancy threshold value, the supersets of the item set to be processed including all the items of the item set to be processed.

In actual application, in a process of depth-first search, an upper bond of weight occupancy technology is applied. If the upper bond of weight occupancy of a certain item set is less than the minimum weight occupancy threshold value, generation and judgment of extended item sets of the item set are ignored, thereby greatly improving the mining performance. The upper bond of weight occupancy is provided on the basis of two theorems, as shown in FIG. 5 and FIG. 6.

The principles of the two theorems are discussed below.

Figure 7:
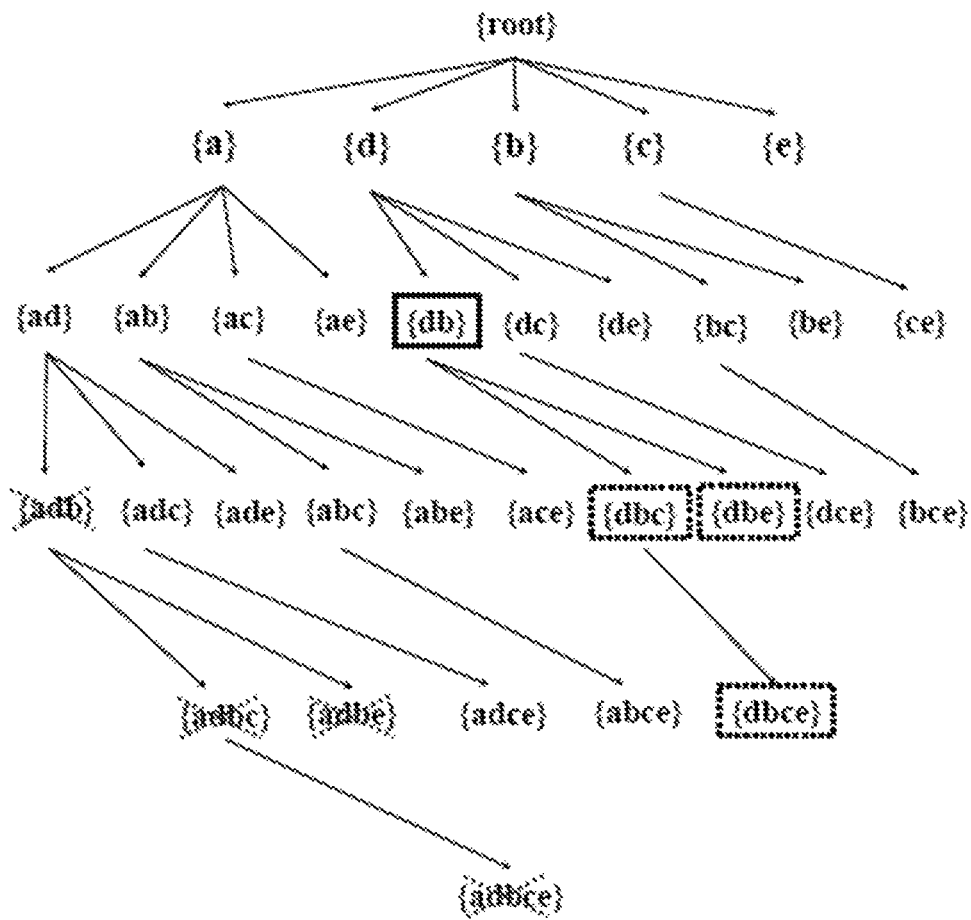
FIG. 7 is another sequencing diagram of the support degrees of the high qualified pattern mining method provided by an embodiment.

The weight occupancies of the various item sets are calculated in sequence according to the sequencing of the support degrees in FIG. 2, and then whether the weight occupancy of the item set is less than the minimum weight occupancy threshold value or not is judged; and if YES, calculation of the weight occupancies of the various item sets below the item set is stopped. As shown in FIG. 7, the weight occupancy of the item set adb is calculated as x1, and x1 is less than the preset minimum weight occupancy threshold value x2, so that the weight occupancies of the various item sets below adb are not calculated in this algorithm, namely the weight occupancies of adbc, adbe and adbce are not required to be calculated. On the basis of the above-mentioned embodiments, the calculation amount is reduced, and the calculation efficiency is improved.

In addition, this embodiment further provides a realizing code of the upper bond of weight occupancy, as shown in FIG. 8. According to the foregoing, the embodiment may mine the item-related high qualified pattern and improve the accuracy of the mining result of the high qualified pattern.

The following describes a high qualified pattern item set mining apparatus provided by an embodiment. The high qualified pattern item set mining apparatus described below and the high quality pattern item set mining method described above may be mutually corresponding references.

FIG. 9 is a block diagram of a structure of a high qualified pattern item set mining apparatus provided by the embodiment. Referring to FIG. 9, the apparatus may include: a first determination module 100, configured to determine a support degree of an item set to be processed in a transaction database; a second determination module 200, configured to determine a weight occupancy of the item set to be processed; and a third determination module 300, configured to determine that the item set to be processed is a high qualified pattern if the support degree of the item set to be processed in the transaction database is not less than a product of a preset lowest support degree threshold value and a total number of transactions in the transaction database, and the weight occupancy of the item set to be processed is not less than a preset minimum weight occupancy threshold value.

Figure 10:
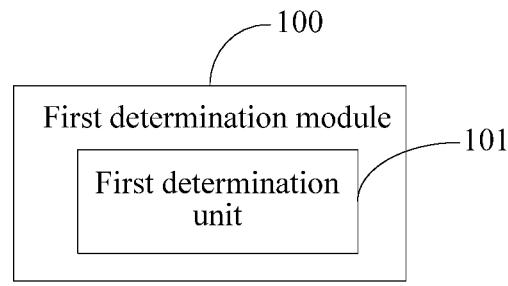
FIG. 10 is a block diagram of a structure of another high qualified pattern mining apparatus provided by an embodiment.

In some possible implementation manners, as shown in FIG. 10, the first determination module 100 includes: a first determination unit 101, configured to determine the number of target transactions corresponding to the item set to be processed as the support degree of the item set to be processed in the transaction database, the target transactions corresponding to the item set to be processed being transactions including all items of the item set to be processed.

Figure 11:
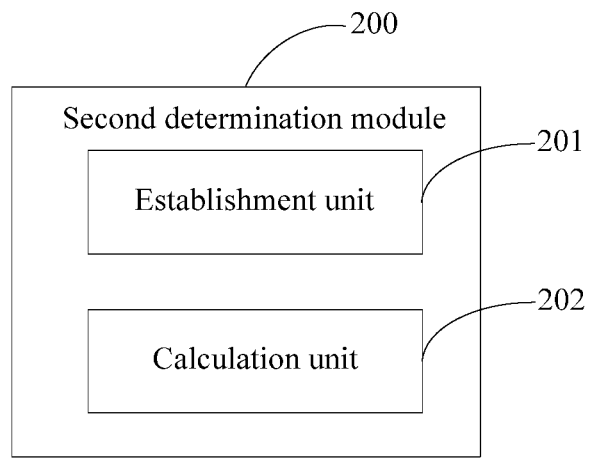
FIG. 11 is a block diagram of a structure of another high qualified pattern mining apparatus provided by an embodiment.

In some possible implementation manners, as shown in FIG. 11, the second determination module 200 includes: an establishment unit 201, configured to establish a weight-table of the various items in the transaction database, the weight-table including weight values corresponding to the various items; and a calculation unit 202, configured to calculate the weight occupancy of the item set to be processed in the transaction database according to the weight-table and a transaction list of the transaction database.

Figure 12:
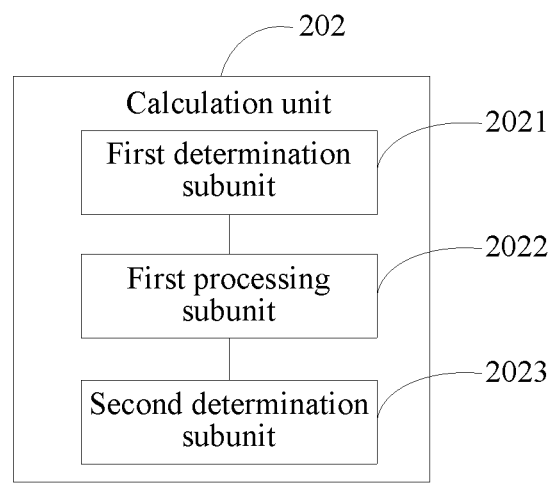
FIG. 12 is a block diagram of a structure of another high qualified pattern mining apparatus provided by an embodiment.

In some possible implementation manners, as shown in FIG. 12, the calculation unit 202 includes: a first determination subunit 2021, configured to determine weight occupancies of the item set to be processed in target transactions, the weight occupancies being quotients of a weight value sum of the items included in the item set to be processed and weight value sums of various items in the target transactions; a first processing subunit 2022, configured to add up the various determined quotients, thus obtaining a quotient sum; and a second determination subunit 2023, configured to divide the obtained quotient sum by the number of the target transactions, thus obtaining the weight occupancy of the item set to be processed.

Figure 13:
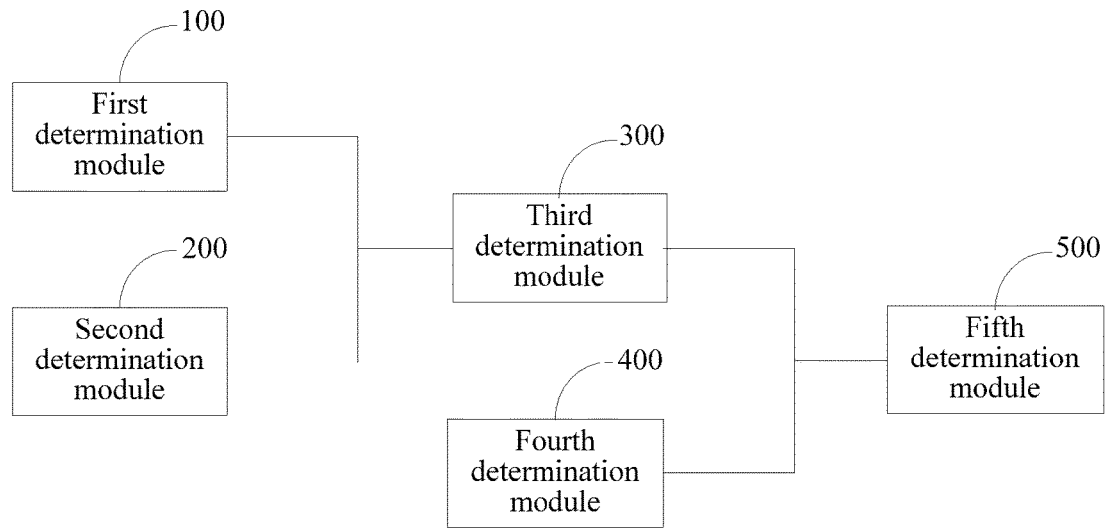
FIG. 13 is a block diagram of a structure of another high qualified pattern mining apparatus provided by an embodiment.

In some possible implementation manners, as shown in FIG. 13, the high qualified pattern mining apparatus further includes: a fourth determination module 400, configured to determine lowest support degree threshold values of the various items in the item set to be processed according to a lowest support degree threshold value table, the lowest support degree threshold values corresponding to the various items being recorded in the lowest support degree threshold value table; and a fifth determination module 500, configured to determine the minimum lowest support degree threshold value in the lowest support degree threshold values of the various items in the item set to be processed as the preset lowest support degree threshold value corresponding to the item set to be processed.

Figure 14:
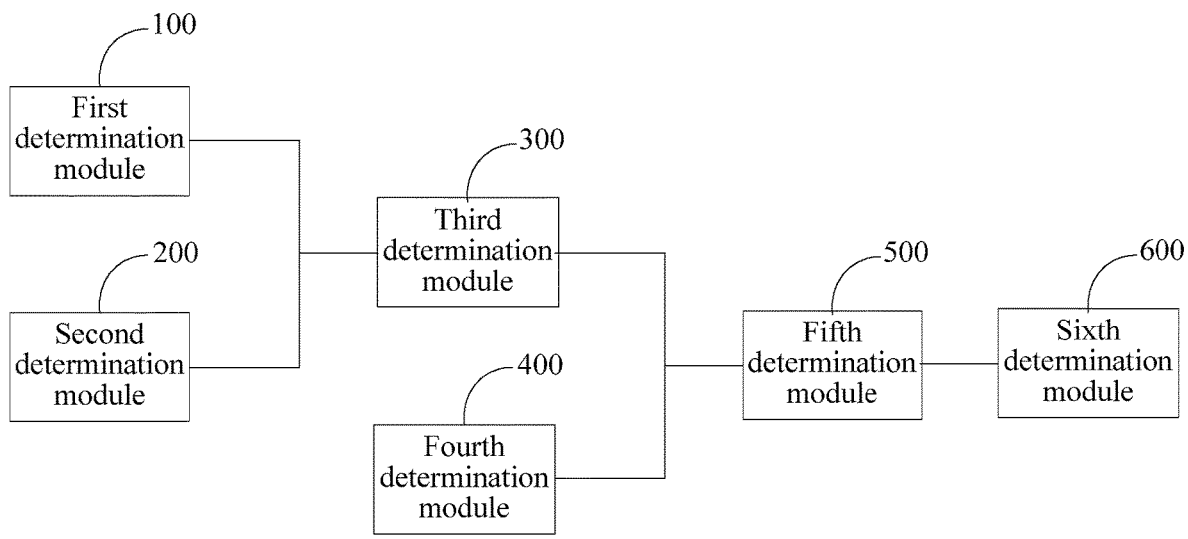
FIG. 14 is a block diagram of a structure of another high qualified pattern mining apparatus provided by an embodiment.

In addition, as shown in FIG. 14, the high qualified pattern mining apparatus further includes: a sixth determination module 600, configured to determine that all supersets of the item set to be processed do not belong to the item-related high qualified pattern if item sets including at least one items are sequenced according to the weight occupancies from small to large, and the weight occupancy of the item set is less than the preset minimum weight occupancy threshold value, the supersets of the item set to be processed including all the items of the item set.

An embodiment further provides a data processing device. The data processing device may include the above-mentioned high qualified pattern mining apparatus.

Figure 15:
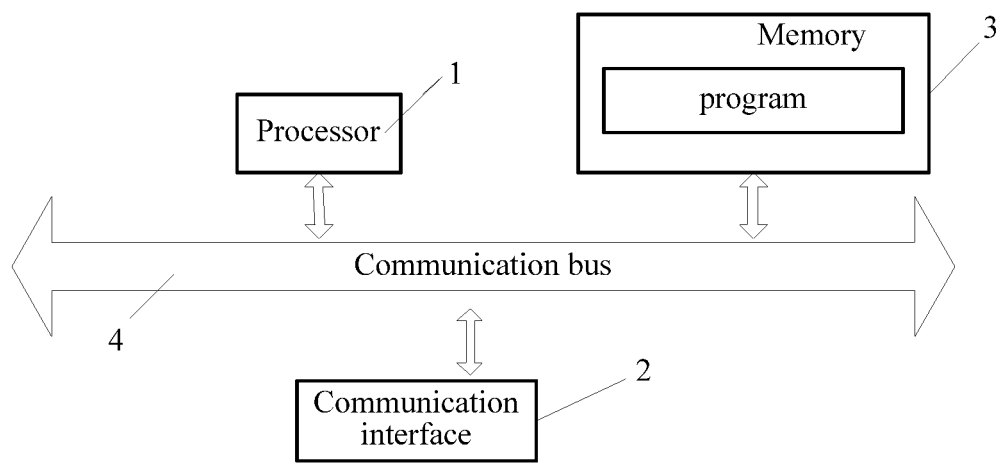
FIG. 15 is a block diagram of a hardware structure of a data processing device provided by an embodiment.

In some possible implementation manners, FIG. 15 shows a block diagram of a hardware structure of a data processing device. Referring to FIG. 15, the data processing device may include: a processor 1, a communication interface 2, a memory 3 and a communication bus 4; the processor 1, the communication interface 2 and the memory 3 complete mutual communication through the communication bus 4; in some possible implementation manners, the communication interface 2 may be an interface of a communication module, such as an interface of a global system for GSM module; the processor 1 is configured to execute a program; the memory 3 is configured to store the program; the program may include a program code, the program code including a computer operation instruction.

The processor 1 may be a central processing unit (CPU), or an application specific integrated circuit (ASIC), or is configured as one or multiple integrated circuits configured to implement the embodiments.

The memory 3 may include a high-speed random access memory (RAM), and may also include a non-volatile memory, such as at least one magnetic disk memory.

The program may be used for: determining a support degree of an item set to be processed in a transaction database; determining a weight occupancy of the item set to be processed; determining that the item set to be processed is a high qualified pattern if the support degree is not less than a product of a preset lowest support degree threshold value and a total number of transactions in the transaction database, and the weight occupancy is not less than a preset minimum weight occupancy threshold value.

According to the foregoing, the high qualified pattern item set mining method provided by the embodiment includes: determining the support degree of the item set to be processed in the transaction database and the weight occupancy of the item set to be processed, and determining that the item set to be processed is the high qualified pattern if the support degree is not less than the product of the preset lowest support degree threshold value and the total number of transactions in the transaction database, and the weight occupancy is not less than the preset minimum weight occupancy threshold value. It can be seen that during mining of the high qualified pattern, to judge whether the item set to be processed is the high qualified pattern or not, the embodiment not only takes an index such as the support degree of the item set to be processed in the transaction database into consideration, but also requires that the weight occupancy of the item set to be processed is not less than the preset minimum weight occupancy threshold value by measuring the weight occupancy of the item set to be processed, thereby mining the high qualified pattern with the support degree not less than the product of the preset lowest support degree threshold value and the total number of transactions in the transaction database, and the weight occupancy of the item set to be processed not less than the preset minimum weight occupancy threshold value, realizing mining of the item-related high qualified pattern, and improving the accuracy of the mining result of the high qualified pattern.

The various embodiments in the description are described in a progressive manner. Contents mainly explained in each embodiment are different from those in other embodiments and the identical or similar parts between the various embodiments are mutual references. The apparatus disclosed by the embodiment corresponds to the method disclosed by the embodiment, and related parts refer to the description of the method part.

A professional can further realize that units and algorithm steps of the various exemplifications described in the embodiments disclosed herein may be implemented by means of electronic hardware, computer software or the combination thereof. To describe the interchangeability of hardware and software clearly, constituents and steps of the various exemplifications have been generally described according to their functions in the above-mentioned descriptions. Whether these functions are executed by means of hardware or software is decided by specific application and design constraint conditions of the technical solutions. The professional can use different methods for each specific application to realize the functions described herein, but this realization should not be deemed as being beyond the scope.

Steps of the method or algorithm described in the embodiment disclosed herein may be directly implemented by means of hardware, a software module executed by the processor, or the combination thereof. The software module may be installed in a random access memory (RAM), an internal memory, a read only memory (ROM), an electrically programmable ROM, an electrically erasable programmable ROM, a register, a hard disk, a mobile magnetic disk, a CD-ROM, or a storage medium in any other forms in the technical field.

According to the above-mentioned descriptions of the disclosed embodiments, a person skilled in the art can implement. It is evident for the person skilled in the art to make various alterations to these embodiments. The general principles defined herein may be realized in other embodiments without departing from the spirit or scope of the present disclosure. Therefore, the present disclosure will not be limited to these embodiments described herein, but shall fall within the widest range consistent with the principles and novel features that are disclosed herein.

What is claimed is:

1. A high qualified pattern mining method performed by one or more processors, the high qualified pattern mining method comprising:
    determining a support degree of an item set to be processed in a transaction database;
    determining a weight value sum of items comprised in the item set to be processed;
    respectively determining quotients of the weight value sum and weight value sums of various items in a target transactions corresponding to the item set to be processed;
    obtaining a quotient sum by adding up the various determined quotients;
    determining a weight occupancy of the item to be processed in the transaction database by dividing the obtained quotient sum by a number of the target transactions corresponding to the item set to be processed; and
    determining that the item set to be processed is a high qualified pattern based on the support degree not being less than a product of a preset lowest support degree threshold value and a total number of transactions in the transaction database, and the weight occupancy not being less than a preset minimum weight occupancy threshold value to improve mining performance.

2. The high qualified pattern mining method according to claim 1, wherein the determining the support degree of the item set to be processed in the transaction database comprises determining a number of target transactions corresponding to the item set to be processed as the support degree of the item set to be processed in the transaction database, and
    wherein the target transactions corresponding to the item set to be processed indicate transactions comprising all items of the item set to be processed.

3. The high qualified pattern mining method according to claim 2, wherein the determining the weight occupancy of the item set to be processed in the transaction database comprises:
    determining a weight-table of various items in the transaction database, the weight-table comprising weight values corresponding to the various items; and
    determining the weight occupancy of the item set to be processed in the transaction database based on the weight-table and a transaction list of the transaction database, the transaction list indicating transactions in the transaction database.

4. The high qualified pattern mining method according to claim 3, wherein
    the weight value sum of items comprised in the item set to be processed is determined based on the weight-table.

5. The high qualified pattern mining method according to claim 4, further comprising:
    determining lowest support degree threshold values of various items in the item set to be processed based on a lowest support degree threshold value table, the lowest support degree threshold values corresponding to the various items being recorded in the lowest support degree threshold value table; and
    determining a minimum lowest support degree threshold value in the lowest support degree threshold values of the various items in the item set to be processed as the preset lowest support degree threshold value corresponding to the item set to be processed.

6. The high qualified pattern mining method according to claim 1, further comprising:
sequencing various item sets in the transaction database according to support degrees of the various item sets; and
determining that all supersets of the item set to be processed do not belong to the high qualified pattern based on the weight occupancy of the item set to be processed being less than the preset minimum weight occupancy threshold value, the supersets of the item set to be processed comprising all items of the item set to be processed.

7. A high qualified pattern item set mining apparatus comprising:
at least one memory configured to store computer program code; and
at least one processor configured to access the at least one memory and operate according to the computer program code, the computer program code comprising:
first determination code configured to cause the at least one processor to determine a support degree of an item set to be processed in a transaction database;
second determination code configured to cause the at least one processor to:
determine a weight value sum of items comprised in the item set to be processed;
respectively determine quotients of the weight value sum and weight value sums of various items in a target transactions corresponding to the item set to be processed;
obtain a quotient sum by adding up the various determined quotients; and
determine a weight occupancy of the item set to be processed in the transaction database by dividing the obtained quotient sum by a number of the target transactions corresponding to the item set to be processed; and
third determination code configured to cause the at least one processor to determine that the item set to be processed is a high qualified pattern based on the support degree not being less than a product of a preset lowest support degree threshold value and a total number of transactions in the transaction database, and the weight occupancy not being less than a preset minimum weight occupancy threshold value to improve mining performance.

8. The high qualified pattern item set mining apparatus according to claim 7, wherein the first determination code is further configured to cause the at least one processor to:
determine a number of target transactions corresponding to the item set to be processed as the support degree of the item set to be processed in the transaction database, the target transactions corresponding to the item set to be processed indicating transactions comprising all items of the item set to be processed.

9. The high qualified pattern item set mining apparatus according to claim 8, wherein the second determination code is further configured to cause the at least one processor to:
determine a weight-table of various items in the transaction database, the weight-table comprising weight values corresponding to the various items; and
determine the weight occupancy of the item set to be processed in the transaction database based on the weight-table and a transaction list of the transaction database, the transaction list indicating transactions in the transaction database.

10. The high qualified pattern item set mining apparatus according to claim 9, wherein the weight value sum of items comprised in the item set to be processed is determined based on the weight-table.

11. The high qualified pattern item set mining apparatus according to claim 10, wherein the computer code further comprises:
fourth determination code configured to cause the at least one processor to determine lowest support degree threshold values of various items in the item set to be processed based on a lowest support degree threshold value table, the lowest support degree threshold values corresponding to the various items being recorded in the lowest support degree threshold value table; and
fifth determination code configured to cause the at least one processor to determine a minimum lowest support degree threshold value in the lowest support degree threshold values of the various items in the item set to be processed as the preset lowest support degree threshold value corresponding to the item set to be processed.

12. The high qualified pattern item set mining apparatus according to claim 7, wherein the computer code further comprises:
sequencing code configured to cause the at least one processor to sequence various item sets in the transaction database according to support degrees of the various item sets; and
sixth determination code configured to cause the at least one processor to determine that all supersets of the item set to be processed do not belong to the high qualified pattern based on the weight occupancy of the item set to be processed being less than the preset minimum weight occupancy threshold value, the supersets of the item set to be processed comprising all items of the item set to be processed.

13. The high qualified pattern item set mining apparatus according to claim 12, wherein the computer code further comprises processing code configured to cause the at least one processor to process the item set to be processed based on whether the item set to be processed is the high qualified pattern.

14. A non-transitory computer-readable storage medium storing instructions that cause at least one processor to:
determine a support degree of an item set to be processed in a transaction database;
determine a weight value sum of items comprised in the item set to be processed;
respectively determine quotients of the weight value sum and weight value sums of various items in a target transactions corresponding to the item set to be processed;
obtain a quotient sum by adding up the various determined quotients;
determine a weight occupancy of the item set to be processed in the transaction database by dividing the obtained quotient sum by a number of the target transactions corresponding to the item set to be processed; and
determine that the item set to be processed is a high qualified pattern based on the support degree not being less than a product of a preset lowest support degree threshold value and a total number of transactions in the transaction database, and the weight occupancy not being less than a preset minimum weight occupancy threshold value to improve mining performance.

15. The non-transitory computer-readable storage medium according to claim 14, wherein the instructions further cause the processor to determine a number of target transactions corresponding to the item set to be processed as the support degree of the item set to be processed in the transaction database, and wherein the target transactions corresponding to the item set to be processed indicate transactions comprising all items of the item set to be processed.

16. The non-transitory computer-readable storage medium according to claim 15, wherein the instructions further cause the processor to:

determine a weight-table of various items in the transaction database, the weight-table comprising weight values corresponding to the various items; and determine the weight occupancy of the item set to be processed in the transaction database based on the weight-table and a transaction list of the transaction database, the transaction list indicating transactions in the transaction database.

17. The non-transitory computer-readable storage medium according to claim 16, wherein the instructions further cause the processor to:

determine the weight value sum of items comprised in the item set to be processed based on the weight-table.

18. The non-transitory computer-readable storage medium according to claim 17, wherein the instructions further cause the processor to:

determine lowest support degree threshold values of various items in the item set to be processed based on a lowest support degree threshold value table, the lowest support degree threshold values corresponding to the various items being recorded in the lowest support degree threshold value table; and determine a minimum lowest support degree threshold value in the lowest support degree threshold values of various items in the item set to be processed as the preset lowest support degree threshold value corresponding to the item set to be processed.

19. The non-transitory computer-readable storage medium according to claim 14, wherein the instructions further cause the processor to:

sequence various item sets in the transaction database according to support degrees of the various item sets; and determine that all supersets of the item set to be processed do not belong to the high qualified pattern based on the weight occupancy of the item set to be processed being less than the preset minimum weight occupancy threshold value, the supersets of the item set to be processed comprising all items of the item set to be processed.

20. The non-transitory computer-readable storage medium according to claim 14, wherein the instructions further cause the processor to:

process the item set to be processed based on whether the item set to be processed is the high qualified pattern.

* * * * *